UNITED STATES PATENT OFFICE.

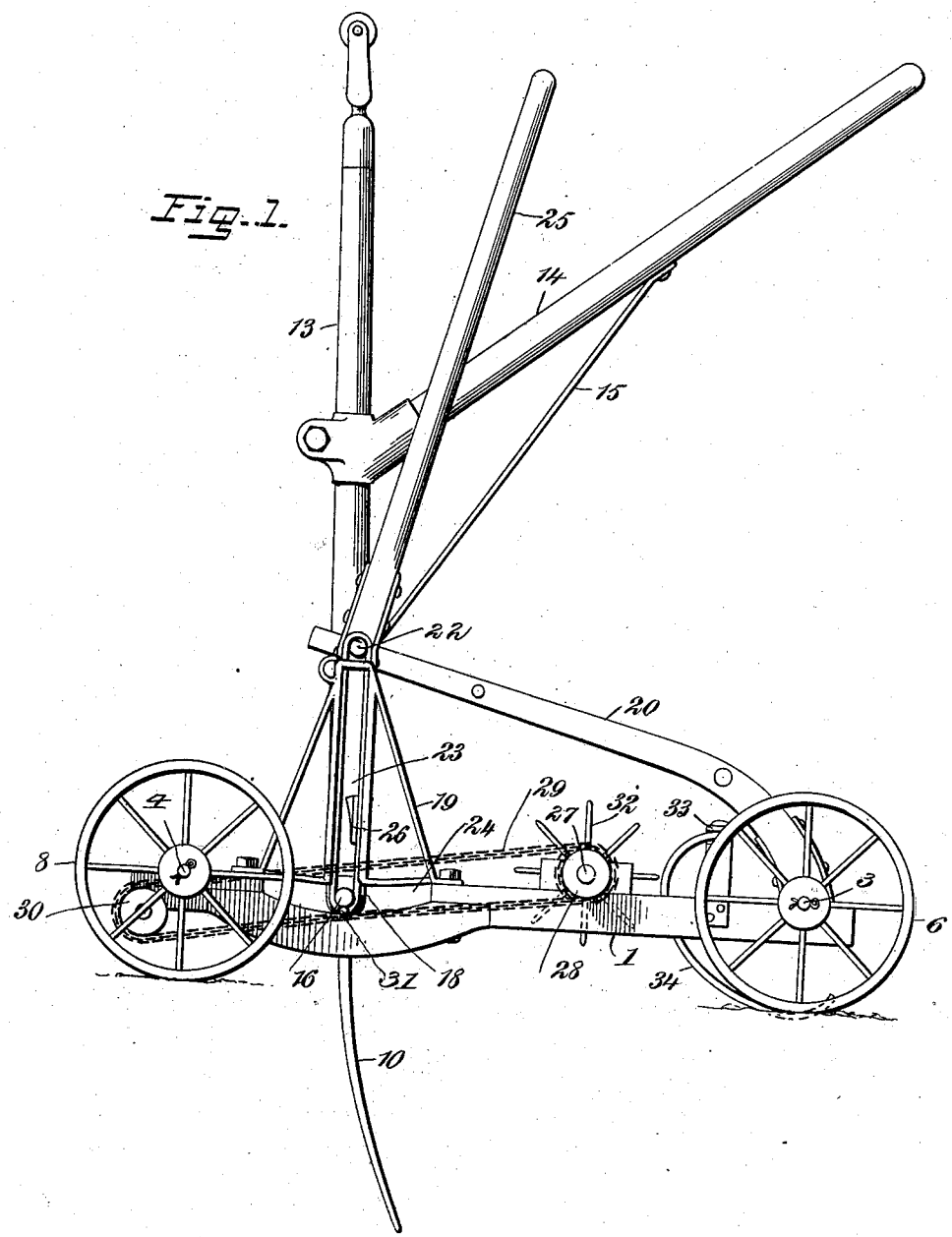

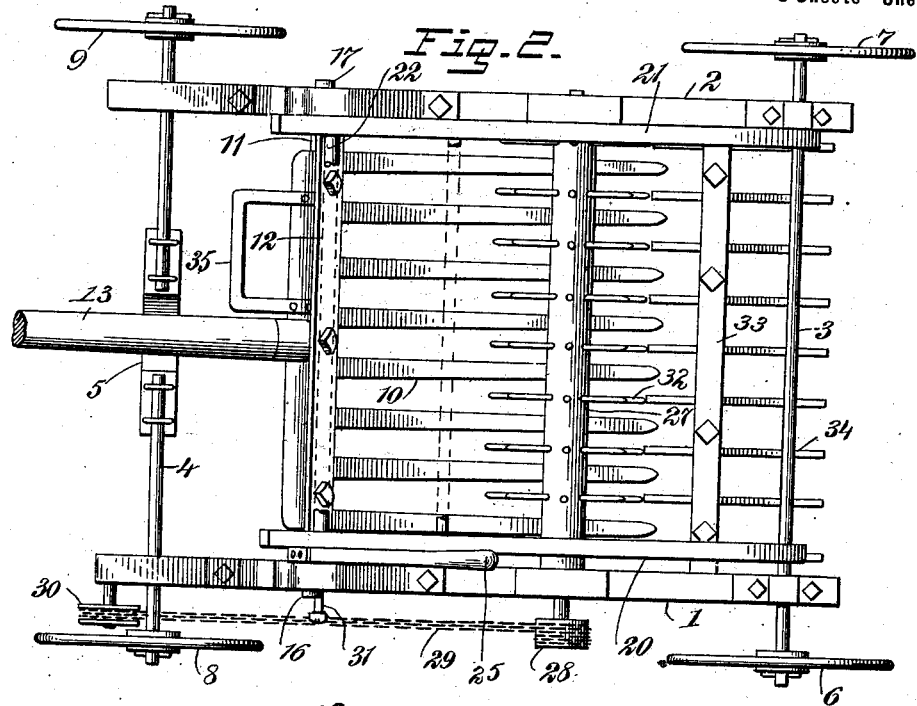

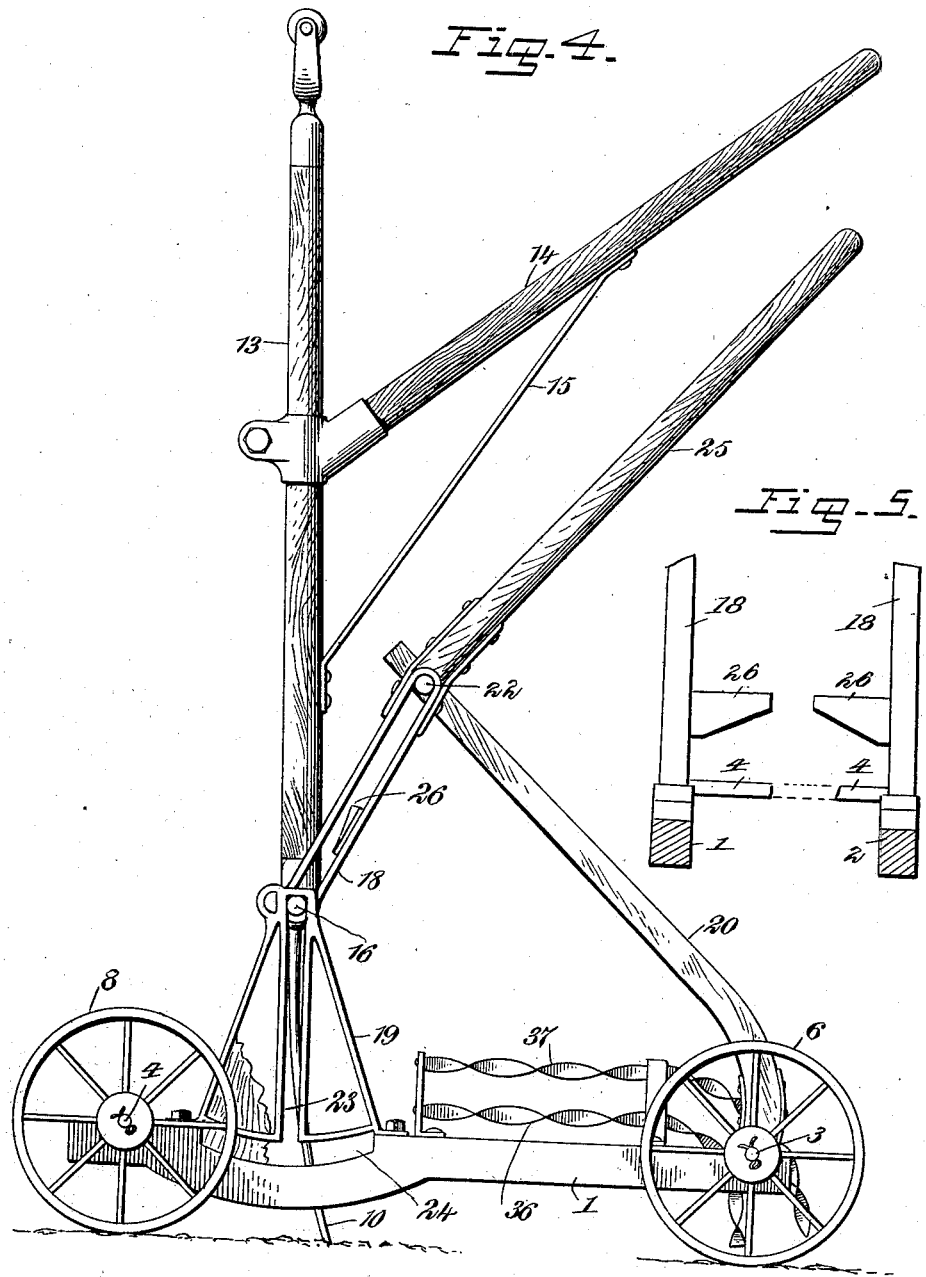

DAVID LUBIN, OF NEW YORK, N. Y.

AGRICULTURAL IMPLEMENT.

SPECIFICATION forming part of Letters Patent No. 717,520, dated December 30, 1902.

Application filed June 3, 1902. Serial No. 110,075. (No model.)

*To all whom it may concern:*

Be it known that I, DAVID LUBIN, a citizen of the United States, and a resident of the city of New York, borough of Manhattan, in the county and State of New York, have invented a new and Improved Agricultural Implement, of which the following is a full, clear, and exact description.

This invention relates to improvements in manually-operated devices for digging and cultivating ground, the object being to provide a device of this character that may be easily operated by one person and by means of which comparatively large slices of earth may be thrown up and finely pulverized before being again deposited on the ground, thus with one machine preparing the ground for seeding or planting.

I will describe an agricultural implement embodying my invention and then point out the novel features in the appended claims.

Reference is to be had to the accompanying drawings, forming a part of this specification, in which similar characters of reference indicate corresponding parts in all the figures.

Figure 1 is a side elevation of an agricultural implement embodying my invention. Fig. 2 is a plan view thereof. Fig. 3 is a side elevation showing a modification. Fig. 4 is a side elevation showing still another modification, and Fig. 5 is a detail showing certain foot-plates employed.

The implement comprises a carriage having side rails 1 2, connected at the front by an axle 3 and at the rear by an axle 4. At the center of the axle 4 is a depression 5, the purpose of which will hereinafter appear. Mounted on the front axle are wheels 6 7 and on the rear axle are wheels 8 9.

Mounted to move vertically and to rotate on a horizontal axis and, further, to swing in a horizontal direction is a digging-tool, here shown as a fork 10, the several tines of which at the head are clamped between clamping-bars 11 12, and extended upward from the head of the digging-tool is a handle 13, from which a supplementary handle 14 extends forward at an incline. A brace-rod 15 connects with the two handles 13 and 14, thus materially strengthening the connection between the two handles.

On the ends of one of the clamping-bars are trunnions 16 and 17, which have bearings in the lower ends of links 18, mounted to move and to swing relatively to standards 19 on the side rails of the carriage. The upper ends of the links are connected to braces 20 21, which are arranged to swing on the front axle 3. These braces are inclined rearward and upward and are connected one with the other by a cross-bar 22. They are also connected by other cross-bars at suitable intervals. The trunnions 16 and 17 are extended outward beyond the outer sides of the links and are designed to move in guides 23 in the standards when the digging-tool is moved upward, and they are designed to move in arc-shaped guides 24 when the digging-tool is in its lowermost position and swung in a horizontal direction. It may be here stated that the standards may be provided with suitable covers which will engage over the guides; but said covers are omitted herein to more clearly show the construction.

From one end of the cross-bar 22 an actuating-lever 25 extends upward at a forward angle, and extended inward from each link is a foot-plate 26.

Supported on the carriage forward of the digging-tool is a breaking device, here shown as a shaft 27, on an extended end of which is a drum 28, and having a series of turns around this drum is a driving-chain 29, the said driving-chain being endless and passing around a pulley 30 at the rear end of the carriage, and one stretch of the chain is attached to a pin 31, extended outward from the link. Projecting outward from the shaft 27 are the breaking teeth or bars 32.

Attached to a cross-bar 33, extended across the carriage forward of the breaking device, are smoothing-tines 34. These smoothing-tines are curved rearward, then downward and forward, the lower ends being adapted to engage on the surface of the broken ground. The rearwardly-projected portions are extended sufficiently far to permit the ends of the tines of the digging-tool to pass between them, as clearly indicated in Fig. 2.

In the operation of this device the digging-tool is to be elevated in a vertical direction, as indicated in Fig. 4, with the ends of its tines resting upon the surface of the ground. At this time the trunnions 16 and 17 will be at the upper portions of the vertical guides. The digging-tool is now to be forced into the ground until the trunnions come below the vertical guides, and to facilitate such entering of the tool into the ground the operator can place his foot on either one of the foot-plates 26. After thus inserting the tool the main handle 13, carrying, of course, with it the handle 14, is to be rocked down, and the carriage may be held from movement during this operation by a person keeping his foot on one of the foot-plates 26 or a foot-strap 35, attached to the head portion of the digging-tool at one side of the main handle. During this movement of course the digging-tool will be moved upward, carrying a load of dirt with it, and the breaking devices 32 will be set in rotary motion through the medium of the chain. The dirt forced against these devices 32 will be finely pulverized and thrown forward against the tines 34, and some portions of the dirt will be forced by the digging-tool between said tines, as before described. When at its substantially horizontal position, as indicated in Fig. 3, with the load lifted, the horizontal swinging movement is to be imparted to the digging-tool. This may be done by rocking the lever 25, which will by means of the links 18 move the load of dirt back and forth underneath the breaking devices, so that all parts of the said dirt will be reached. It may be more convenient at certain times to rock the tool by the operator placing his foot on one of the foot-plates 26. It is obvious that it may also be rocked in a horizontal direction by means of the handles 13 and 14. It may be stated that the handle 14 is designed to ease the labor of the person operating the machine—that is, after moving the digging-tool to a certain height in lifting a load the handle 13 may be released and the rest of the downward movement imparted by the handle 14. To permit the digging-tines to pass a considerable distance upward, sometimes above the plane of the carriage, I provide the depression 5, into which the handle 13 may pass. After lifting and pulverizing one load of dirt, as just described, the device is to be moved backward for further operation in a new bite of dirt. During this movement the tines 34 will smooth the previously-lifted dirt.

In Fig. 3 I have shown a device the main features of which are the same as above described. Instead of the rotating breaking device, however, I employ breaking-teeth 36, which are supported vertically by cross-clamping bars 37, attached at the ends to bars 38, supported on the side portions of the carriage-frame, and smoothing-teeth 34 are attached to this frame and serve the purpose as before described. In the operation of this device the load of dirt is lifted and forced upward between the breaking devices 36. Of course these breaking devices will puncture the earth, and after lifting the digging-tool substantially to the position indicated in dotted lines in said Fig. 3 the horizontal swinging motion is to be imparted to the tool, which will finely pulverize the ground.

In the example of my improvement shown in Fig. 4 the main elements are the same as those before described; but the breaking bars or devices consist of two series of longitudinally-twisted bars 36 and 37. The bars 37 are arranged above the bars 36, and these several bars are connected to cross-bars supported on the carriage. The forward ends of the bars 36 and 37 are curved downward, so as to serve as smoothing devices. In the operation of this example the load of dirt is to be lifted and forced between the breaking-bars 36 and 37, and when in such position the horizontal swinging movement is to be imparted to the digging-tool. The twists of the bars will cause the earth to finely separate and fall back to the ground in a thoroughly-mixed condition.

Having thus described my invention, I claim as new and desire to secure by Letters Patent—

1. In an agricultural implement, a carriage, a digging-tool mounted to swing on a horizontal axis, and also mounted to swing on a substantially horizontal plane, and breakers on the carriage coacting with the digging-tool, substantially as specified.

2. In an agricultural implement, a carriage, a digging-tool mounted to move vertically relatively to the carriage, to swing on a horizontal axis and to swing in a substantially horizontal plane, and breaking devices supported on the carriage and coacting with the digging-tool, substantially as specified.

3. An agricultural implement comprising a carriage, a digging-tool mounted for vertical movement with relation to the carriage, to swing on a horizontal axis and to swing in a substantially horizontal plane, and a rotary breaking device operated by movements of the digging-tool, substantially as specified.

4. In an agricultural implement, a carriage, a digging-tool mounted to move vertically with relation to the carriage, to swing on a horizontal axis and to swing substantially in a horizontal plane, a shaft mounted on the carriage, breaking-bars extended outward from said shaft, an endless chain extended around a drum on said shaft, a pulley at the rear of the carriage and around which said chain passes, and a connection between one stretch of the chain and the digging-tool, substantially as specified.

5. In an agricultural implement, a carriage, standards on opposite sides of said carriage, the said standards having vertical guides and horizontally-disposed guides at the lower portion, a digging-tool, trunnions extended from said digging-tool and adapted to move in said guides, a handle extended upward from the digging-tool, links with the lower ends of which said trunnions engage, the said links being connected one with the other, and a handle for imparting swinging movements to the links to swing the digging-tool in a substantially horizontal plane, substantially as specified.

6. In an agricultural implement, a carriage, standards on opposite sides of said carriage, the said standards having vertical guides and horizontally-disposed guides at the lower portion, a digging-tool, trunnions extended from said digging-tool and adapted to move in said guides, a handle extended upward from the digging-tool, links with the lower ends of which said trunnions engage, the said links being connected one with the other, a handle for imparting swinging movements to the links to swing the digging-tool in a substantially horizontal plane, and foot-plates on the links, substantially as specified.

7. In an agricultural implement, a carriage, standards on opposite sides of said carriage, the said standards having vertical guides and horizontally-disposed guides at the lower portion, a digging-tool, trunnions extended from said digging-tool and adapted to move in said guides, a handle extended upward from the digging-tool, links with the lower ends of which said trunnions engage, the said links being connected one with the other, a handle for imparting swinging movements to the links to swing the digging-tool in a substantially horizontal plane, foot-plates on the links, and swinging braces carried with the links, substantially as specified.

8. In an agricultural implement, a carriage, a digging-tool comprising tines mounted to move vertically with relation to the carriage, to swing on a horizontal axis and to swing substantially in a horizontal plane, a main handle extended upward from the tool, a handle extended outward at an incline from the first-named handle, a rotary breaking device on the carriage, and means for causing a rotary movement of said breaking device during a movement of the digging-tool, substantially as specified.

9. An agricultural implement comprising a carriage, a digging-tool mounted to rock on a horizontal axis and to swing in a substantially horizontal plane, a rotary breaking device operated by said swinging movement of the digging-tool, and smoothing-tines on the carriage forward of said breaking device, substantially as specified.

In testimony whereof I have signed my name to this specification in the presence of two subscribing witnesses.

DAVID LUBIN.

Witnesses:
JNO. M. RITTER,
C. R. FERGUSON.